United States Patent
Williams et al.

(10) Patent No.: US 11,595,443 B2
(45) Date of Patent: *Feb. 28, 2023

(54) SYSTEM AND METHOD FOR TRANSMITTING A DATA STREAM IN A NETWORK

(71) Applicant: AT&T Intellectual Property I, L.P., Atlanta, GA (US)

(72) Inventors: Stuart J. Williams, Annandale, VA (US); Allan Theall, Mt. Airy, MD (US); Timothy Tuggle, Trussville, AL (US); Steven Axt, Acworth, GA (US); Charlton Gardiner, Great Falls, VA (US); Kathleen Tse, Holmdel, NJ (US); John Humphries, Athens, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 101 days.

This patent is subject to a terminal disclaimer.

(21) Appl. No.: 17/144,766

(22) Filed: Jan. 8, 2021

(65) Prior Publication Data

US 2021/0160286 A1  May 27, 2021

Related U.S. Application Data

(63) Continuation of application No. 16/117,309, filed on Aug. 30, 2018, now Pat. No. 10,951,654.

(51) Int. Cl.
*H04L 9/40* (2022.01)
*H04J 14/02* (2006.01)
(Continued)

(52) U.S. Cl.
CPC .......... *H04L 63/18* (2013.01); *H04J 14/0256* (2013.01); *H04K 1/006* (2013.01);
(Continued)

(58) Field of Classification Search
CPC .............. H04J 14/0256; H04J 14/0258; H04K 1/006; H04Q 11/0066; H04Q 2213/13295;
(Continued)

(56) References Cited

U.S. PATENT DOCUMENTS

| 7,224,902 B2 * | 5/2007 | Nishiki | H04J 14/005 398/87 |
| 9,954,611 B1 * | 4/2018 | Lee | H04B 10/07957 |

(Continued)

OTHER PUBLICATIONS

Shawbaki, W., 2006. Security in Passive Optical Network via Wavelength Hopping and Codes cycling techniques. In EC2ND 2005 (pp. 73-82). Springer, London. (Year: 2006).*

(Continued)

*Primary Examiner* — James R Turchen
(74) *Attorney, Agent, or Firm* — Guntin & Gust, PLC; Atanu Das

(57) ABSTRACT

In one embodiment, a method includes receiving, by a network controller and from a first node of a network, information associated with a data stream of the network and determining, by the network controller, a segmentation for the data stream. The segmentation includes a plurality of data segments and the plurality of data segments includes a first data segment. The method further includes determining, by the network controller, a data flow path for each of the plurality of data segments and determining, by the network controller, a first wavelength to assign to the first data segment. The first wavelength is one of a plurality of wavelengths spanning between the first node and a second node of the network.

20 Claims, 5 Drawing Sheets

(51) Int. Cl.
*H04K 1/00* (2006.01)
*H04Q 11/00* (2006.01)
(52) U.S. Cl.
CPC .................. *H04Q 11/0066* (2013.01); *H04Q 2213/13295* (2013.01)
(58) Field of Classification Search
CPC ......... H04Q 11/00; H04L 45/62; H04L 9/083; H04L 63/00; H04L 63/18
See application file for complete search history.

(56) References Cited

U.S. PATENT DOCUMENTS

| | | | | |
|---|---|---|---|---|
| 2002/0141409 | A1* | 10/2002 | Chang | H04L 12/1836 398/166 |
| 2006/0115272 | A1* | 6/2006 | Minato | H04J 14/005 398/77 |
| 2008/0298805 | A1* | 12/2008 | Lee | H04L 45/62 398/48 |
| 2009/0110402 | A1* | 4/2009 | Bernstein | H04J 14/0246 398/79 |
| 2009/0262942 | A1* | 10/2009 | Maeda | H04L 9/083 380/278 |
| 2011/0135305 | A1* | 6/2011 | Barnard | H04Q 11/0066 398/49 |
| 2015/0215688 | A1* | 7/2015 | Sambo | H04J 14/0267 398/48 |

OTHER PUBLICATIONS

Bernstein, et al., "Signaling extensions for wavelength switched optical networks.", Internet Requests for Comments, RFC Editor, RFC, 7689., 2015, 16 pgs.

Harris, et al., "A novel wavelength hopping passive optical network (WH-PON) for provision of enhanced physical security.", Journal of Optical Communications and Networking, 4(3), 2012, 7.

Lee, et al., "Framework for GMPLS and path computation element (PCE) control of wavelength switched optical networks (WSONs).", RFC 6163, Apr. 1, 2011, 51 pgs.

* cited by examiner

SYSTEM AND METHOD FOR TRANSMITTING A DATA STREAM IN A NETWORK

CROSS-REFERENCE TO RELATED APPLICATIONS

This application is a Continuation of and claims priority to application Ser. No. 16/117,309 filed Aug. 30, 2018. The contents of each of the foregoing is hereby incorporated by reference into this application as if set forth herein in full.

TECHNICAL FIELD

This disclosure generally relates to a data stream, and more specifically to a system and method for securely transmitting a data stream in a network.

BACKGROUND

Customers of telecommunications service providers are increasingly using optical bandwidth to exchange electronic information, such as email messages or videos, over networks. The telecommunications service providers may dedicate a single wavelength to a customer. If a malicious actor gains access to the dedicated wavelength, the customer's personal information may be compromised.

SUMMARY

According to an embodiment, a method includes receiving, by a network controller and from a first node of a network, information associated with a data stream of the network and determining, by the network controller, a segmentation for the data stream. The segmentation includes a plurality of data segments and the plurality of data segments includes a first data segment. The method further includes determining, by the network controller, a data flow path for each of the plurality of data segments and determining, by the network controller, a first wavelength to assign to the first data segment. The first wavelength is one of a plurality of wavelengths spanning between the first node and a second node of the network.

According to another embodiment, a system includes one or more processors and a memory storing instructions that, when executed by the one or more processors, cause the one or more processors to perform operations including receiving, by a network controller and from a first node of a network, information associated with a data stream of the network and determining, by the network controller, a segmentation for the data stream. The segmentation includes a plurality of data segments and the plurality of data segments includes a first data segment. The operations further include determining, by the network controller, a data flow path for each of the plurality of data segments and determining, by the network controller, a first wavelength to assign to the first data segment. The first wavelength is one of a plurality of wavelengths spanning between the first node and a second node of the network.

According to yet another embodiment, one or more computer-readable storage media embody instructions that, when executed by a processor, cause the processor to perform operations including receiving, by a network controller and from a first node of a network, information associated with a data stream of the network and determining, by the network controller, a segmentation for the data stream. The segmentation includes a plurality of data segments and the plurality of data segments includes a first data segment. The operations further include determining, by the network controller, a data flow path for each of the plurality of data segments and determining, by the network controller, a first wavelength to assign to the first data segment. The first wavelength is one of a plurality of wavelengths spanning between the first node and a second node of the network.

Technical advantages of this disclosure may include one or more of the following. This disclosure provides a system that may increase security of a network by obfuscating a data stream at an optical layer. Embodiments of this disclosure such as segmentation and dynamic wavelength hopping can be layered with security features at Open Systems Interconnection (OSI) model layers to create a robust defense in data protection. Embodiments of this disclosure such as the operations of the network controller in determining segmentation and data flow paths for a data stream may leverage the orchestration of a service provider's network. While some optical vendors may use security features that occur at the customer edge equipment or as an overlay, this disclosure utilizes a network controller that may dynamically assign different wavelengths for optical spans across a service provider's core network rather than providing limited functionality at the customer edge.

Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

To assist in understanding the present disclosure, reference is now made to the following description taken in conjunction with the accompanying drawings, in which.

DETAILED DESCRIPTION

Customers of telecommunications service providers are increasingly using large optical bandwidth circuits to exchange information over networks. Telecommunications service providers may optimize optical circuits by splitting the optical frequency into separate channels using various technologies such as Dense Wavelength Division Multiplexing (DWDM), Coarse Wave Division Multiplexing (CWDM), sub-channel optic switching, and wavelength optic switching. A customer may receive one wavelength or sub-channel and maintain that wavelength or sub-channel throughout the network. Despite optimizing the optical spectrum for use across a larger number of users, providing a dedicated wavelength or sub-channel to a user does not provide dynamic security protection. If a malicious actor gains access to the particular wavelength or sub-channel and conducts packet captures, the malicious actor could potentially collect enough samples of optical frames or packets that would assist in data capture and breaking the encryption scheme.

This disclosure assists with maintaining confidentiality of a data stream transmitted in networks by breaking up the transmitted data stream into smaller pieces, which reduces the surface area of the transmitted data that a malicious actor can access. The malicious actor may attempt to collect sample optical frames in an effort to break encryption schemes. If the data stream is segmented when one or more optical frames are compromised, the compromised data includes a small portion of the data in the data stream. This small portion of compromised data may not provide enough context to compromise the entire data stream. Segmenting the data also makes it more difficult for a malicious actor to associate different data streams with different customers. Changing the wavelength between network nodes (e.g., optical switches) creates a dynamic environment that obfuscates the optical path over which the data stream traverses the network, which makes it more challenging for a malicious actor to keep track of and associate the data for a particular customer.

Figure 1:
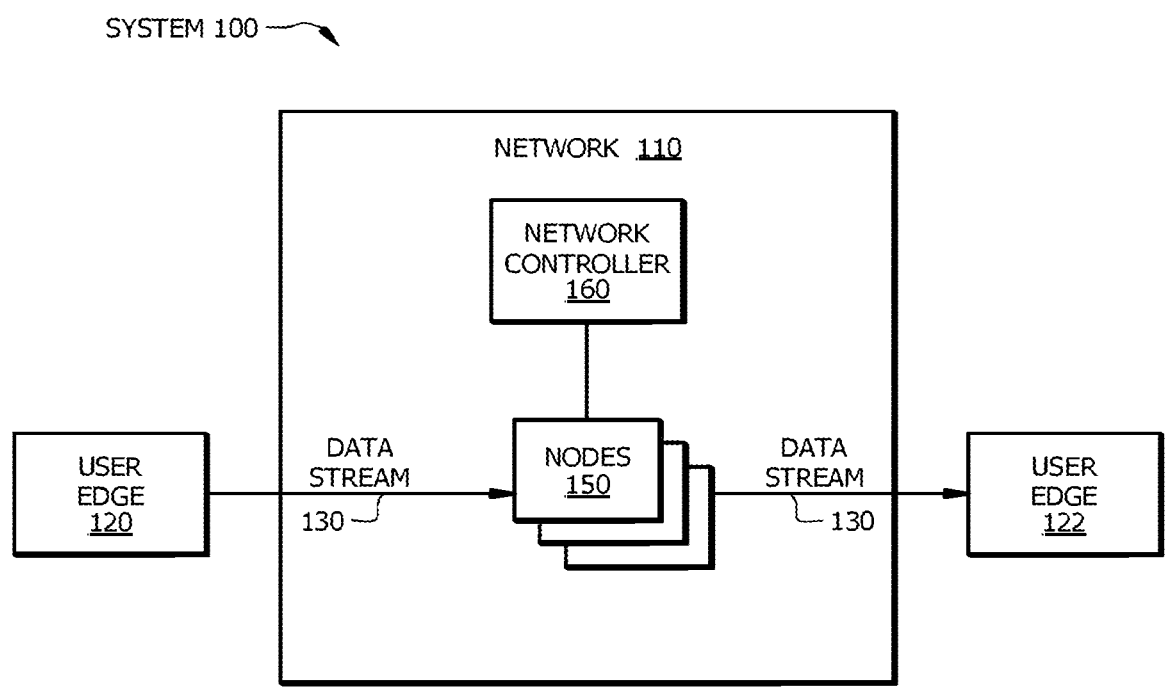
FIG. 1 illustrates an example system for transmitting a data stream in a network.
Figure 2:
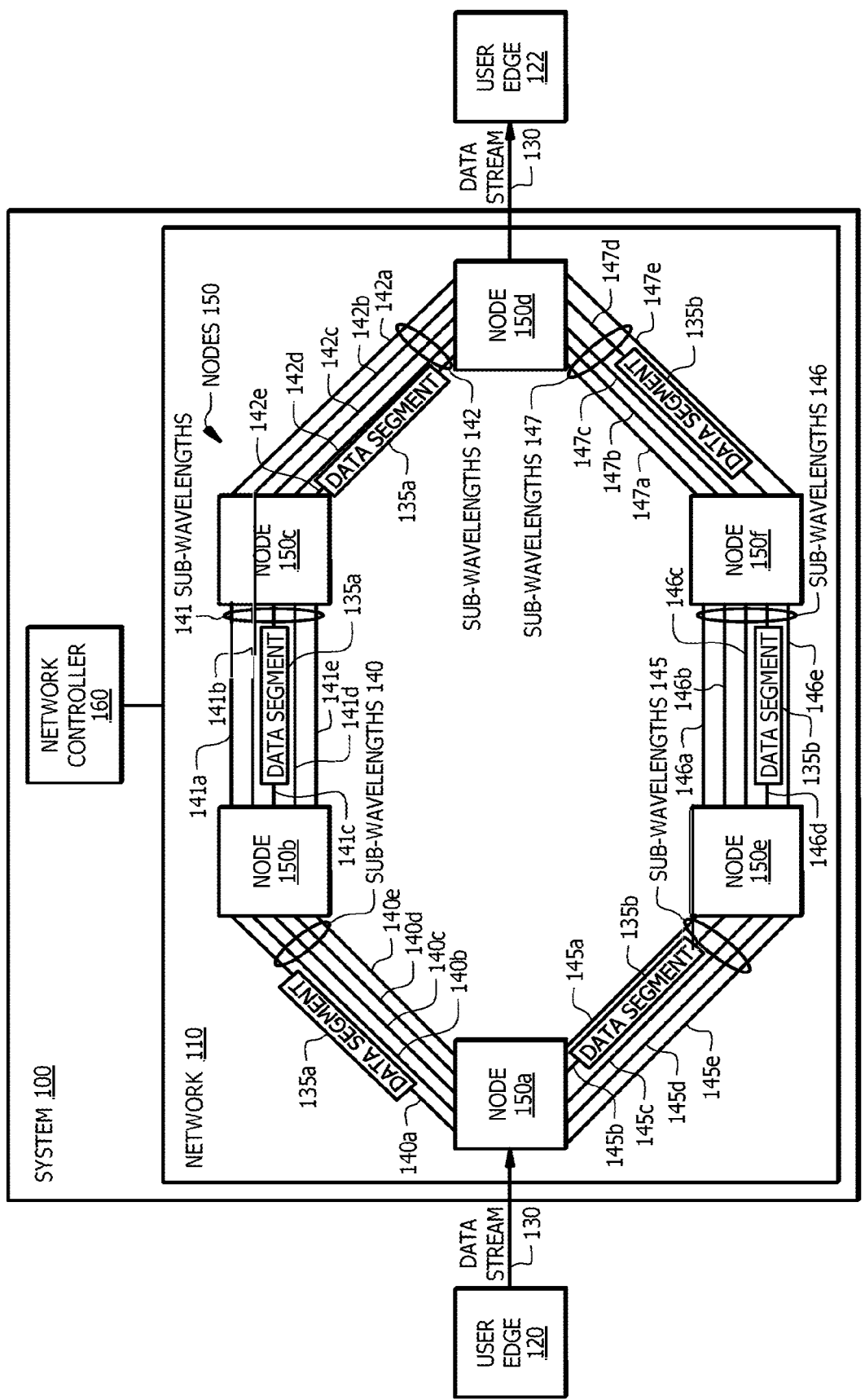
FIG. 2 illustrates additional details of the nodes of system of FIG. 1.
Figure 3:
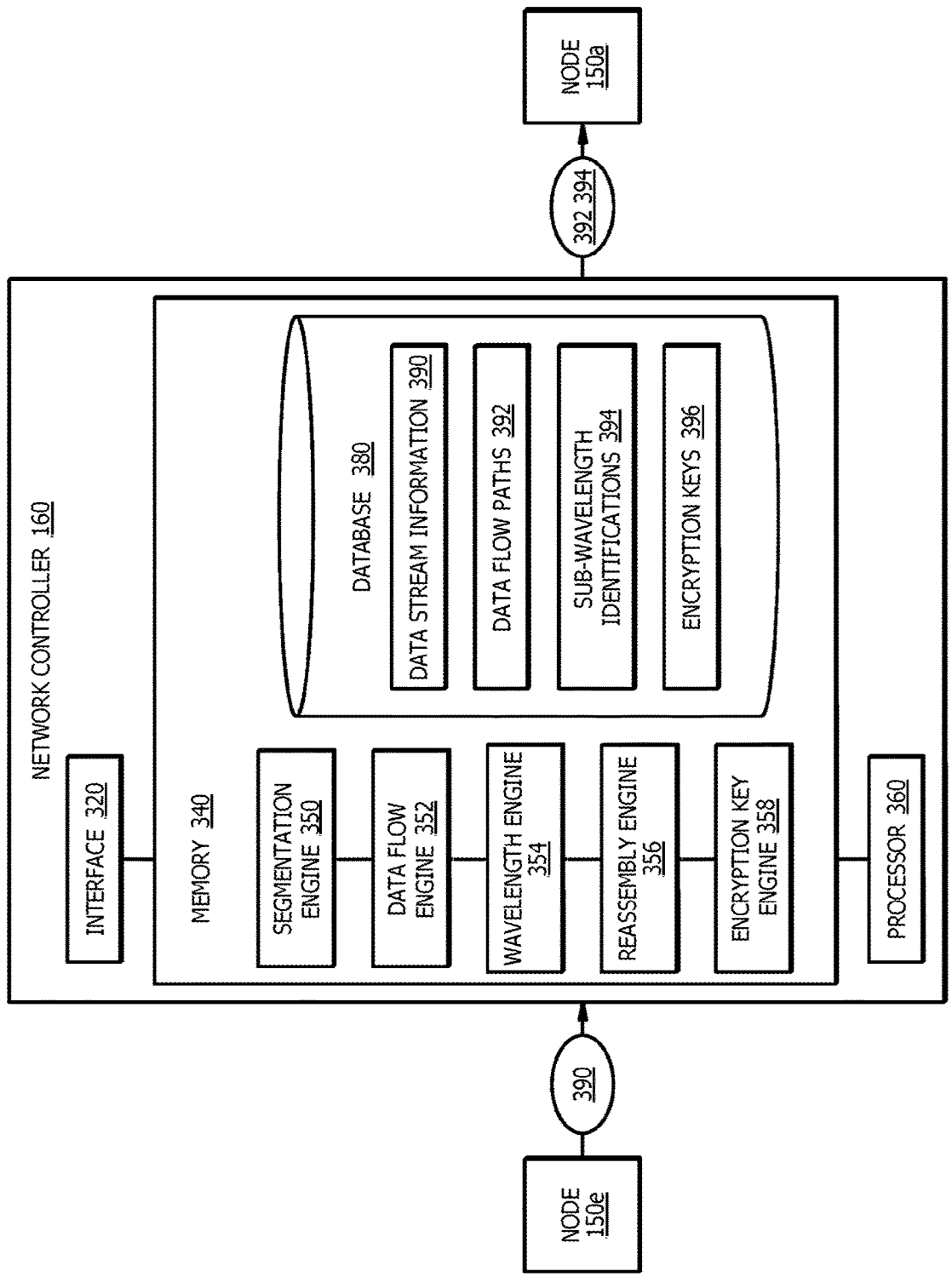
FIG. 3 illustrates an example network controller that may be used by the system of FIG. 1.
Figure 4:
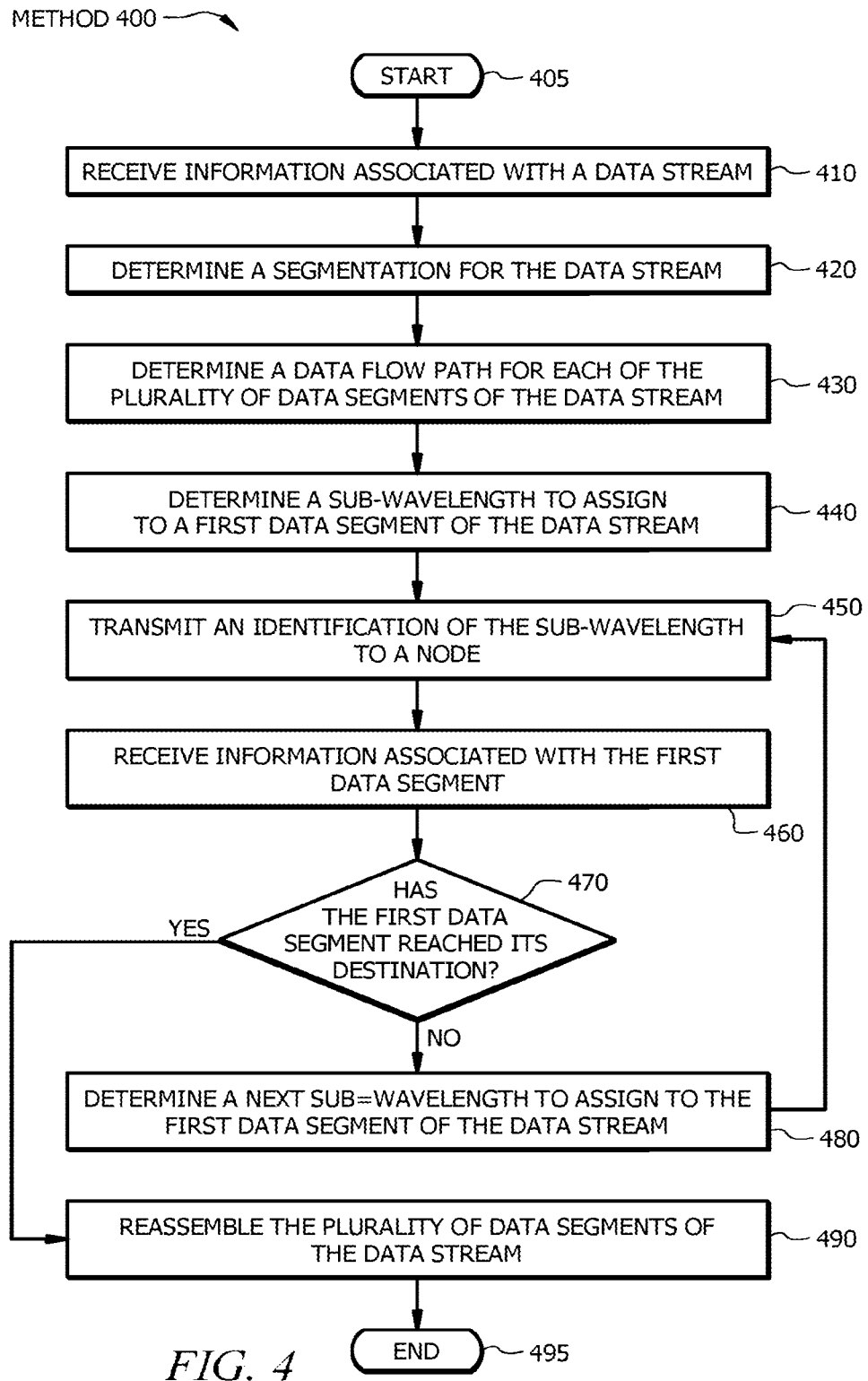
FIG. 4 illustrates an example method for transmitting a data stream in a network.
Figure 5:
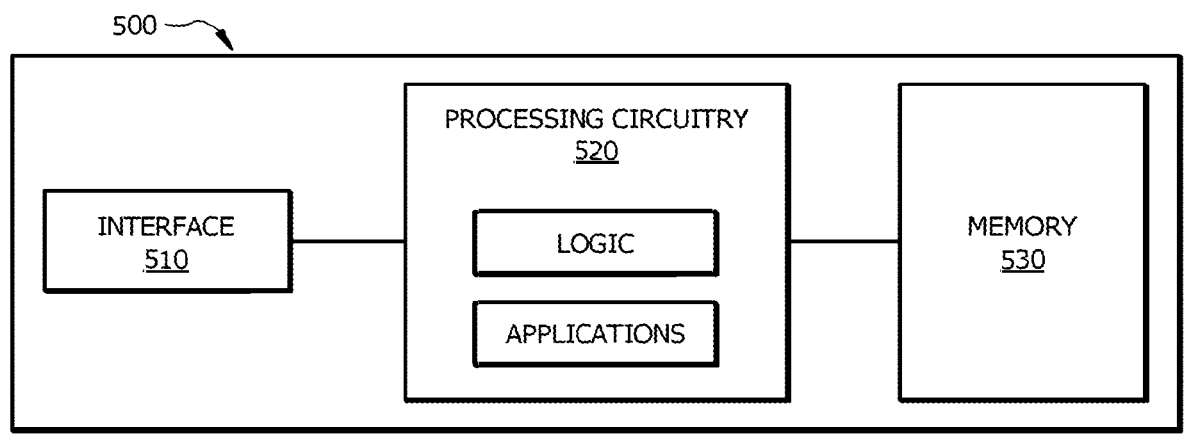
FIG. 5 illustrates an example computer system that may be used by the systems and methods described herein.

FIGS. 1 through 5 show example systems and methods for transmitting a data stream in a network. FIG. 1 shows an example system for transmitting a data stream in a network and FIG. 2 shows additional details of the nodes of the system of FIG. 1. FIG. 3 shows an example network controller that may be used by the system of FIG. 1. FIG. 4 shows an example method for transmitting a data stream in a network. FIG. 5 shows an example computer system that may be used by the systems and methods described herein.

FIG. 1 illustrates an example system 100 for transmitting a data stream in a network. System 100 of FIG. 1 includes a network 110, user edges 120 and 122, data stream 130, nodes 150, and a network controller 160. System 100 or portions thereof may be associated with an entity, which may include any entity, such as a business or company, that transmits a data stream in a network. The elements of system 100 may be implemented using any suitable combination of hardware, firmware, and software.

Network 110 may be any type of network that facilitates communication between components of system 100. Network 110 may connect user edge 120, user edge 122, nodes 150, and network controller 160 of system 100. Although this disclosure shows network 110 as being a particular kind of network, this disclosure contemplates any suitable network. One or more portions of network 110 may include software-defined networking (SDN) technology. One or more portions of network 110 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. For example, network controller 160 may communicate over network 110, including receiving information from nodes 150 and transmitting information to nodes 150. As another example, user edges 120 and 122 may communicate over network 110, including transmitting data stream 130 to nodes 150 and receiving data stream 130 from nodes 150. Network 110 may be associated with an entity. For example, network 110 may be a service provider's core network.

User edges 120 and 122 each represent a device that provides an entry point into network 110 (e.g., a service provider's core network). User edge 120 and/or user edge 122 may be a router, a switch, an integrated access device, a multiplexer, a MAN access device, a WAN access device, or the like. User edge 120 and/or user edge 122 may be a mobile computing device with wireless network connection capabilities (e.g., wireless-fidelity (WI-FI), and/or BLUETOOTH capabilities). For example, user edge 120 and/or user edge 122 may include a smartphone, a laptop computer, or a tablet computer. User edge 120 and/or user edge 122 may also include a non-mobile device such as a television or a desktop computer. User edge 120 and/or user edge 122 may be associated with a user (e.g., a customer of an entity). For example, user edge 120 may be a device used by a first customer of a service provider associated with network 110 and user edge 122 may be a device used by a second customer of the service provider associated with network 110. As another example, user edge 120 may be a device used by a customer of a service provider associated with network 110 and user edge 122 may be a device used by customer of a different service provider outside of network 110. In some embodiments, user edge 120 and user edge 122 are the same device. User edge 120 transmits data stream 130 to nodes 150 of network 110. User edge 122 receives data stream 130 from nodes 150.

Data stream 130 is any stream of data that can be used to transmit and receive information. Data stream 130 may be a sequence of signals (e.g., digitally encoded coherent signals). Data stream 130 may be an email message, a file, a voice memo, a video, or a combination thereof. Data stream 130 may include the following information: a starting point for data stream 130, a destination of data stream 130, a level of security for data stream 130, a level of sensitivity of data stream 130 for latency, a level of sensitivity of data stream 130 for jitter, and/or a level of sensitivity of network 110 for available network data paths. This information may be used by network controller 160 to segment data stream 130 into a plurality of data segments. Data stream 130 may include one or more data packets. A data packet is a formatted unit of data that may include a header that identifies a starting point (e.g., user edge 120) and/or a destination (user edge 122) of data stream 130.

Each node 150 of system 100 represents a communication point that can receive, create, store, and/or transmit data along distributed network routes (i.e., flow paths). Each node 150 is programmed to recognize, process, and forward data to other nodes 150 of network 110. Each node 150 may be a switch (e.g., an optical switch), a virtual machine, a router (e.g., a wavelength router), or the like. Each node 150 may be an SDN-enabled node that relies upon network controller 160 to provide instructions for certain operations (e.g., segmenting and forwarding data stream 130). Each node 150 may include a computer system such as the computer system illustrated in FIG. 5.

Nodes 150 receive data stream 130 from user edge 120. Nodes 150 may receive instructions from network controller 160 for segmenting data stream 130. Nodes 150 may segment data stream 130 into a plurality of data segments (e.g., optical frame segments) in accordance with the instructions received from network controller 160. For example, a first node 150 of network 110 may receive instructions from network controller 160 to segment data stream 130 into a first data segment and a second data segment, and the first node 150 of network 110 may segment data stream 130 into a first data segment and a second data segment in accordance with the received instructions.

Nodes 150 may receive instructions from network controller 160 for forwarding data stream 130 in network 110 in accordance with a data flow path. Nodes 150 may forward data stream 130 in accordance with the instructions received from network controller 160. For example, a first node 150 of network 110 may receive instructions from network controller 160 to forward a first data segment of data stream 130 from the first node 150 to a second node 150 of network 110, and first node 150 may forward the first data segment of data stream 130 to the second node 150 of network 110 in accordance with the received instructions.

Each node 150 of network 110 may be connected to another node 150 of network 150 via an optical span. Nodes 150 may be optical switches interconnected by optical fibers such that data stream 130 is transmitted between nodes 150 of network 110 using wavelengths. The international standard International Telecommunication Union —Telecommunications (ITU-T)) G.694.1 may be used to determine which wavelengths are used for optical transmissions. Each wavelength between two nodes 150 of network 110 may be broken into smaller wavelengths. For example, a wavelength between a first node 150 and a second node 150 of network 110 may be broken into a plurality of wavelengths. Nodes 150 may receive instructions from network controller 160 for transmitting data stream 130 along wavelengths of network 110. Nodes 150 may transmit data stream 130 along the wavelengths in accordance with the instructions from network controller 160. For example, a first node 150 of network 110 may receive instructions from network controller 160 to transmit a first data segment of data stream 130 to a second node 150 of network 110 along a seventh wavelength of a plurality of seventy-two wavelengths spanning between the first node 150 and the second node 150. As another example, the second node 150 of network 110 may receive instructions from network controller 160 to transmit the first data segment of data stream 130 to a third node 150 of network 110 along a forty-first wavelength of the plurality of seventy-two wavelengths spanning between the second node 150 and the third node 150. The concept of a data segment traversing nodes 150 of network 110 using different wavelengths is referred to as wavelength hopping.

Network controller 160 of system 100 represents a controller node of network 110 that controls one or more behaviors of network 110. Network controller 160 may be an SDN controller that automatically programs the behavior of an SDN network. For example, network controller 160 may be a centralized software-based controller that instructs subordinate nodes (e.g., nodes 150) on how to segment and forward network traffic (e.g., data stream 130).

Network controller 160 may receive information associated with data stream 130 from nodes 150. For example, network controller 160 may receive information such as a bandwidth requirement for data steam 130, a destination of data stream 130, a level of security for data stream 130, a level of sensitivity of data stream 130 for latency, a level of sensitivity of data stream 130 for jitter, and/or a level of sensitivity of network 110 for available network data paths.

Network controller 160 may use the information associated with data stream 130 to determine a segmentation of data stream 130. For example, network controller 160 may determine, based on the level of security for data stream 130, to segment the data into a certain number of data segments such that more data segments are provided for a heightened level of security (e.g., a national security email message) as opposed to a normal level of security (e.g., a personal email message). Network controller 160 may communicate instructions to segment data stream 130 into a plurality of data segments to one or more nodes 150 of network 110.

Network controller 160 may use the information associated with data stream 130 to determine a data flow path for each of the plurality of data segments of data stream 130. For example, network controller 160 may determine, based on the bandwidth requirement for a first data segment of data steam 130, to transmit the first data segment from a first node 150 to a second node 150 of network 110 if the available bandwidth between the first and second nodes 150 of network 110 exceed the bandwidth requirement of the first data segment. Network controller 160 may communicate instructions to transmit the plurality of data segments of data stream 130 along the data flow path to one or more nodes 150 of network 110.

Network controller 160 may use the information associated with data stream 130 to determine which wavelengths to assign to each of the plurality of data segments of data stream 130. For example, network controller 160 may determine, based on the level of security for data stream 130, to assign different wavelengths to a first data segment of the plurality of data segments for every hop of the first data segment between nodes 150 of network 110 for a heightened level of security (e.g., a national security email message). As another example, network controller 160 may determine, based on the level of security for data stream 130, to assign the same wavelength to the first data segment for every hop of the first data segment between nodes 150 of network 110 for a normal level of security (e.g., a personal email message). Network controller 160 may communicate instructions to transmit the wavelength assignments to one or more nodes 150 of network 110.

Network controller 160 may assign a wavelength to a user (e.g., a customer of an entity) for a predetermined duration. Upon completion of the user's data transmission for the assigned wavelength, network controller 160 may return the assigned wavelength to the plurality of available wavelengths that can be assigned to another user.

Network controller 160 may determine a reassembly of the plurality of data segments of data stream 130. A destination node 150 may receive the plurality of data segments of data stream 130 from other nodes 150 of network 110 and transmit information associated with the plurality of data segments to network controller 160. Network controller 160 may use this information to determine how to reassemble the plurality of segments of data stream 130. The reassembled data segments may reconfigure data stream 130 such that data stream 130 at destination node 150 is the same or substantially the same as data stream 130 received by a start node 150 from user edge 120 of system 100. Network controller 160 may provide instructions to destination node 150 for reassembling the plurality of data segments of data stream 130.

Network controller 160 may determine an encryption key to assign to each of the plurality of data segments of data stream 130. An encryption key is a random string of bits used to scramble and unscramble each data segment. Each encryption key is unique. Network controller 160 may receive the encryption keys from one or more components of system 100. For example, network controller 160 may receive the encryption keys from a key server. Network controller 160 may use the information associated with data stream 130 to determine which encryption key to assign to each of the plurality of data segments of data stream 130. For example, network controller 160 may determine, based on the level of security for data stream 130, to assign a different encryption key to each data segment for a heightened level of security. As another example, network controller 160 may determine, based on the level of security for data stream 130, to assign the same encryption key to each data segment of data stream 130 for a normal level of security. Network controller 160 transmits the encryption keys to nodes 150 of network 110. Network controller 160 may determine, based on the level of security for data stream 130, to assign an encryption key with a strong key size (e.g., a longer than average key length) to each data segment of data stream 130. The strong key size may increase the complexity required to break the encryption scheme.

Although FIG. 1 illustrates a particular arrangement of network 110, user edge 120, user edge 122, nodes 150, and network controller 160, this disclosure contemplates any suitable arrangement of network 110, user edge 120, user edge 122, nodes 150, and network controller 160. Two or more of user edge 120, user edge 122, nodes 150, and network controller 160 may be connected to each other directly, bypassing network 110. Two or more of security user edge 120, user edge 122, nodes 150, and network controller 160 may be physically or logically co-located with each other in whole or in part. Although FIG. 1 illustrates a particular number of networks 110, user edges 120, user edges 122, nodes 150, and network controllers 160, this disclosure contemplates any suitable number of networks 110, user edges 120, user edges 122, nodes 150, and network controllers 160. For example, network 110 may include multiple network controllers 160.

In operation, user edge 120 transmits data stream 130 (e.g., an email message or a video) to a start node 150 of network 110. Start node 150 transmits information associated with data stream 130 to network controller 160. Network controller 160 determines a segmentation for data stream 130. The segmentation includes a plurality of data segments (e.g., optical frames). Network controller 160 also determines a data flow path for each of the plurality of data segments and an initial wavelength to assign to each of the plurality of data segments. The initial wavelengths may be determined using a pseudo-random number generator. Network controller 160 communicates the segmentation, the data flow path, and the identifications of the initial wavelengths to start node 150. Start node 150 transmits the plurality of data segments to another node 150 of network 110 in accordance with the data flow path and the assigned wavelengths. Each node 150 along the data flow path that receives a data segment of the plurality of data segments requests and receives, from network controller 160, an identification of a subsequent wavelength and transmits the data segment to another node of network 110 along the identified subsequent wavelength. When each of the plurality of data packets reaches a destination node 150 of network 110, destination node 150 requests and receives, from network controller 160, instructions to reassemble the data segments of data stream 130. Destination node 150 reassembles the data segments in accordance with the instructions received from network controller 160 and transmits reassembled data stream 130 to user edge 122.

As such, system 100 of FIG. 1 transmits data stream 130 in network 110 using segmentation and wavelength hopping, which increases the security of data stream 130 by reducing the surface area of the transmitted data that a malicious actor can access and by obfuscating the transmitted data to make the transmitted data more difficult to track.

FIG. 2 illustrates additional details of nodes 150 of system 100 of FIG. 1. Nodes 150 include start node 150a, node 150b, node 150c, destination node 150d, node 150e, and node 150f. Wavelengths 140, 141, 142, 145, 146, and 147 span between nodes 150 of network 110. Wavelengths 140, which include wavelength 140a, 140b, 140c, 140d, and 140e, span between start node 150a and node 150b; wavelengths 141, which include wavelength 141a, 141b, 141c, 141d, and 141e, span between node 150b and node 150c; wavelengths 142, which include wavelength 142a, 142b, 142c, 142d, and 142e, span between node 150c and destination node 150d; wavelengths 145, which include wavelength 145a, 145b, 145c, 145d, and 145e, span between start node 150a and node 150e; wavelengths 146, which include wavelength 146a, 146b, 146c, 146d, and 146e, span between node 150e and node 150f; and wavelengths 147, which include wavelength 147a, 147b, 147c, 147d, and 147e, span between node 150f and destination node 150d. While each hop between nodes 150 of network 110 includes five wavelengths, each hop between nodes 150 of network 110 can include any suitable number of wavelengths and/or wavelengths.

Start node 150a receives data stream 130 from user edge 120. Start node 150a transmits information associated with data stream 130 to network controller 160. Network controller 160 determines a segmentation of data stream 130 that segments data stream 130 into a plurality of data segments. Network controller 160 transmits instructions to segment data stream 130 into data segment 135a and data segment 135b to start node 150a. Start node 150a segments data stream 130 into data segment 135a and data segment 135b in accordance with the received instructions.

Network controller 160 determines, from the information associated with data stream 130, a data flow path for data segment 135a and data segment 135b. The determined data flow path for data segment 135a is from start node 150a to node 150b, from node 150b to node 150c, and from node 150c to destination node 150d. The determined data flow path for data segment 135b is from start node 150a to node 150e, from node 150e to node 150f, and from node 150f to destination node 150d. Network controller 160 communicates the data flow paths for data segment 135a and data segment 135b to start node 150a. Start node 150a transmits data segment 135a from start node 150a to node 150b in accordance with the received data flow path for data segment 135a. Start node 150a transmits data segment 135b from start node 150a to node 150e in accordance with the received data flow path for data segment 135b.

Network controller 160 determines, from the information associated with data stream 130, a wavelength to assign to data segment 135a and a wavelength to assign to data segment 135b. Network controller 160 may determine which wavelength to assign to each data segment using Equation 1:

$$f(\lambda_{n-1}) = \lambda_n + RNG(\lambda_n, \alpha, \beta) \quad \text{[Equation 1]}$$

where:
$f(\lambda_{n+1})$=indicates a function to change the wavelength from node to node;
RNG=Random Number Generator (RNG) function;
$\lambda$=lambda for wavelength;
$\alpha$, $\beta$=other inputs for the RNG function; and
n=indicates the sequential hop between nodes 150 along the data flow path.

Equation 1 may use the latest available spectrum and/or wavelengths approved by governing bodies (e.g., ITU-T). For example, the calculation may use the latest wavelengths provided by standard ITU-T G.694.1 or a future version of this standard. Equation 1 uses a non-specific RGN function to change the wavelength between different hops.

Network controller 160 may determine to assign wavelength 140*a* spanning between start node 150*a* and node 150*b* to data segment 135*a*. Wavelength 140*a* may represent a channel number provided by standard ITU-T G.694.1. For example, wavelength 140*a* may represent channel number 7, or wavelength 1572.06 nanometers (nm) of ITU-T G.694.1. Channel number 7 may be calculated using Equation 1. For n=0, Equation 1 performed for start node 150*a* (e.g., a first optical switch) results in $\lambda_1$:

$$f(\lambda_{n-1})=\lambda_n+RNG(\lambda_n,\alpha,\beta)$$

$$f(\lambda_{0-1})=\lambda_0+RNG(\lambda_0,\alpha,\beta)$$

$$f(\lambda_1)=\lambda_0+RNG(\lambda_0,\alpha,\beta)$$

$$f(\lambda_1)=7$$

The RNG may be calculated to produce an integer value that falls within the ITU-T G.694.1 spectrum. Multiple inputs and calculations may be used to produce a more "random" integer value. Network controller 160 communicates the assignment of wavelength 140*a* (e.g., channel number 7) to data segment 135*a* to start node 150*a*. Start node 150*a* transmits data segment 135*a* from start node 150*a* to node 150*b* along wavelength 140*a* in accordance with the received assignment for data segment 135*a*.

Node 150*b* of network 110 receives data segment 135*a* from node 150*a* along wavelength 140*a*. Node 150*b* receives data flow path for data segment 135*a* from network controller 160 and transmits data segment 135*b* from node 150*b* to node 150*c* in accordance with the received data flow path for data segment 135*a*. Network controller 160 may determine to assign wavelength 141*c* to data segment 135*a*. Wavelength 141*c* may represent channel number 41, or wavelength 1544.53 nm of ITU-T G.694.1. Channel number 41 may be calculated using Equation 1. For n=1, Equation 1 performed for node 150*b* (e.g., a second optical switch) results in $\lambda_2$:

$$f(\lambda_{n+1})=\lambda_n+RNG(\lambda_n,\alpha,\beta)$$

$$f(\lambda_{1+1})=\lambda_1+RNG(\lambda_1,\alpha,\beta)$$

$$f(\lambda_2)=7+RNG(7,\alpha,\beta)$$

$$f(\lambda_2)=7+34$$

$$f(\lambda_2)=41$$

Network controller 160 communicates the assignment of wavelength 141*c* (e.g., channel number 41) to data segment 135*a* to node 150*b*. Node 150*b* transmits data segment 135*a* from node 150*b* to node 150*c* along wavelength 141*c* in accordance with the received assignment for data segment 135*a*.

Node 150*c* receives data segment 135*a* from node 150*b* along wavelength 141*c*. Node 150*c* receives data flow path for data segment 135*a* from network controller 160 and transmits data segment 135*b* from node 150*c* to destination node 150*d* in accordance with the received data flow path for data segment 135*a*. Network controller 160 may determine to assign wavelength 142*e* to data segment 135*a*. Wavelength 142*e* may represent channel number 11, or wavelength 1568.67 nm of ITU-T G.694.1. Channel number 11 may be calculated using Equation 1. For n=2, Equation 1 performed for node 150*c* (e.g., a third optical switch) results in $\lambda_3$:

$$f(\lambda_{n+1})=\lambda_n+RNG(\lambda_n,\alpha,\beta)$$

$$f(\lambda_{2+1})=\lambda_2+RNG(\lambda_2,\alpha,\beta)$$

$$f(\lambda_3)=41+RNG(41,\alpha,\beta)$$

$$f(\lambda_3)=41+(-52)$$

$$f(\lambda_3)=-11$$

$$f(\lambda_3)=|-11|$$

$$f(\lambda_3)=11$$

As shown in this example calculation, the RNG value may be negative to decrease the channel number. The result from adding the previous channel number 41 with an RNG value of −52 is negative (i.e., −11). The absolute value of the negative value is used to ensure the resulting value is a positive integer that corresponds to the approved list of channels.

Network controller 160 communicates the assignment of wavelength 142*e* (e.g., channel number 11) to data segment 135*a* to node 150*c*. Node 150*c* transmits data segment 135*a* from node 150*c* to destination node 150*d* in accordance with the received assignment for data segment 135*a*. Destination node 150*d* receives data segment 135*a* from node 150*c* along wavelength 142*e*.

Data segment 135*b* may be transmitted from start node 150*a* to destination node 150*d* using a process similar to the transmittal of data segment 135*a*. Start node 150*a* receives the data flow path and wavelength assignment for data segment 135*b* from network controller 160 and transmits data segment 135*b* from start node 150*a* to node 150*e* along assigned wavelength 145*b* in accordance with the received data flow path and wavelength assignment. Node 150*e* receives the data flow path and wavelength assignment for data segment 135*b* from network controller 160 and transmits data segment 135*b* from node 150*e* to node 150*f* along assigned wavelength 146*d* in accordance with the received data flow path and wavelength assignment. Node 150*f* receives the data flow path and wavelength assignment for data segment 135*b* from network controller 160 and transmits data segment 135*b* from node 150*f* to destination node 150*d* along assigned wavelength 147*d* in accordance with the received data flow path and wavelength assignment. In the illustrated embodiment of FIG. 2, wavelength 145*b* and wavelength 146*d* are different wavelengths, whereas sub wave-length 146*d* and 147*d* are the same wavelengths.

Destination node 150*d* receives data segment 135*a* and data segment 135*b*. Destination node 150*d* may receive instructions from network controller 160 to reassemble data segment 135*a* and 135*b* of data stream 130. Destination node 150*d* may reassemble data segment 135*a* and 135*b* in accordance with the received instructions and transmit reassembled data stream 130 to user edge 122.

Although FIG. 2 illustrates a particular arrangement and number of nodes 150, data segments (e.g., data segment 135*a*), and wavelengths (e.g., wavelengths 140), this disclosure contemplates any suitable arrangement and number of nodes 150, data segments, and wavelengths. For example, less or fewer nodes may be connected to start node 150*a* and/or destination node 150*d*. As another example, the data flow path for data segment 135*a* and/or data segment 135*b* may include fewer or more nodes 150. As still another example, wavelengths 140, 141, 142, 145, 146, and 147 may include fewer or more than five wavelengths.

Although FIG. 2 illustrates particular components performing particular operations, this disclosure contemplates any suitable component performing any suitable operation.

For example, nodes 150 may determine which wavelength to assign to data segment 135a and/or data segment 135b using Equation 1. As another example, network controller 160 may determine one or more values (e.g., the RNG value) for Equation 1 and transmit the one or more values to node 150a, and node 150a may determine a wavelength assignment using Equation 1 and the one or more values received from network controller 160.

FIG. 3 illustrates an example network controller 160 that may be used by the system of FIG. 1. Network controller 160 includes interface 320, memory 340, and processor 360. Memory 340 includes segmentation engine 350, data flow engine 352, wavelength engine 354, reassembly engine 356, and encryption key engine 358. Database 380 includes data stream information 390, data flow paths 392, wavelength identifications 394, and encryption keys 396.

Interface 320 of network controller 160 represents any suitable computer element that can receive information from network 110, transmit information through network 110, perform suitable processing of the information, communicate to other components (e.g., nodes 150) of system 100, or any combination of the preceding. Interface 320 may receive data stream information 390 from nodes 150 via network 110, for example. Interface 320 may transmit data flow paths 392 and wavelength identifications 394 to nodes 150, as another example. Interface 320 may receive encryption keys 396 from an encryption key server via network 110, as still another example. Interface 320 represents any port or connection, real or virtual, including any suitable combination of hardware, firmware, and software, including protocol conversion and data processing capabilities, to communicate through a LAN, a WAN, or other communication system that allows system 100 to exchange information between components of system 100.

Memory 340 of network controller 160 stores, permanently and/or temporarily, received and transmitted information, as well as system software, control software, other software for network controller 160, and a variety of other information. Memory 340 may store information for execution by processor 360. Memory 340 stores segmentation engine 350, data flow engine 352, wavelength engine 354, reassembly engine 356, encryption key engine 358, and database 380. Memory 340 includes any one or a combination of volatile or non-volatile local or remote devices suitable for storing information. Memory 340 may include Random Access Memory (RAM), Read-only Memory (ROM), magnetic storage devices, optical storage devices, or any other suitable information storage device or a combination of these devices. Memory 340 may include any suitable information for use in the operation of network controller 160. Additionally, memory 340 may be a component external to (or may be partially external to) network controller 160. Memory 340 may be located at any location suitable for memory 340 to communicate with network controller 160.

Processor 360 of network controller 160 controls certain operations of network controller 160 by processing information received from interface 320 and memory 340 or otherwise accessed by processor 360. Processor 360 communicatively couples to interface 320 and memory 340. Processor 360 may include any hardware and/or software that operates to control and process information. Processor 360 may be a programmable logic device, a microcontroller, a microprocessor, any suitable processing device, or any suitable combination of the preceding. Additionally, processor 360 may be a component external to network controller 160. Processor 360 may be located in any location suitable for processor 360 to communicate with network controller 160. Processor 360 controls the operation segmentation engine 350, data flow engine 352, wavelength engine 354, reassembly engine 356, and encryption key engine 358.

Segmentation engine 350 of network controller 160 is a computer program that determines a segmentation for data stream 130 transmitted through network 110. Segmentation engine 350 may use the information associated with data stream 130 to determine a segmentation of data stream 130. The information associated with data stream 130 may include a bandwidth requirement for data steam 130, a destination of data stream 130, a level of security for data stream 130, a level of sensitivity of data stream 130 for latency, a level of sensitivity of data stream 130 for jitter, and/or a level of sensitivity of network 110 for available network data paths. Segmentation engine 350 may determine to segment data stream 130 into a plurality of data segments (e.g., data segments 135a and 135b of FIG. 2). Segmentation engine 350 may determine, based on the level of security for data stream 130, to segment the data into more data segments for a heightened level of security than for a normal level of security. Segmentation engine 350 may determine, based on the level of sensitivity of data stream 130 for latency, to segment the data into more data segments for a normal level of sensitivity for latency than for a heightened level of sensitivity for latency. Segmentation engine 350 may determine, based on the level of sensitivity of data stream 130 for jitter, to segment the data into more data segments for a normal level of sensitivity for jitter than for a heightened level of sensitivity for jitter. Network controller 160 may communicate instructions to segment data stream 130 into a plurality of data segments to one or more nodes 150 of network 110.

Data flow engine 352 of network controller 160 is a computer program that determines a data flow path for each of the plurality of data segments of data stream 130. Data flow engine 352 may use the information associated with data stream 130 to determine a data flow path for each of the plurality of data segments of data stream 130. For example, data flow engine 352 may determine, based on the bandwidth requirement for a first data segment of data steam 130, to transmit the first data segment from a first node 150 to a second node 150 of network 110 if the available bandwidth between the first and second nodes 150 of network 110 exceed the bandwidth requirement of the first data segment.

Wavelength engine 354 of network controller 160 is a computer program that determines which wavelengths to assign to each of the plurality of data segments of data stream 130. Wavelength engine 354 may use the information associated with data stream 130 to determine which wavelengths to assign to each of the plurality of data segments of data stream 130. For example, wavelength engine 354 may determine, based on a level of security for data stream 130, to assign different wavelengths to a first data segment for every hop of the first data segment on the data flow path for a heightened level of security. As another example, wavelength engine 354 may determine, based on the level of security for data stream 130, to assign the same wavelength to the first data segment for two or more hops of the first data segment on the data flow path for a normal level of security.

Reassembly engine 356 of network controller 160 is a computer program that determine a reassembly of the plurality of data segments of data stream 130. A destination node 150 (e.g., destination node 150d of FIG. 2) may receive the plurality of data segments (e.g., data segments 135a and 135b) of data stream 130 from other nodes 150 of network 110 and transmit information associated with the plurality of data segments to network controller 160. Reassembly engine 356 may use this information to determine how to reassemble the plurality of segments of data stream 130. For example, reassembly engine 356 may use information in the header of each data segment to determine how to reorder the plurality of data segments. The reassembled data segments may reconfigure data stream 130 such that data stream 130 at the destination node 150 is the same or substantially the same as data stream 130 received by a start node 150 from user edge 120 of system 100. Network controller 160 may provide instructions to destination node 150 for reassembling the plurality of data segments of data stream 130.

Encryption key engine 358 of network controller 160 may determine an encryption key to assign to each of the plurality of data segments of data stream 130. Network controller 160 may receive the encryption keys from one or more components of system 100. For example, encryption key engine 358 may receive the encryption keys from an encryption key server. The encryption key server may be located internally to or externally to network 110. The encryption key server may maintain a list of compromised encryption keys that are out of service. Encryption key engine 358 will not assign a compromised encryption key to a data segment.

Encryption key engine 358 may use the information associated with data stream 130 to determine which encryption key to assign to each of the plurality of data segments of data stream 130. For example, encryption key engine 358 may determine, based on the level of security for data stream 130, to assign a different encryption key to each data segment for a heightened level of security. As another example, encryption key engine 358 may determine, based on the level of security for data stream 130, to assign the same encryption key to each data segment of data stream 130 for a normal level of security. Network controller 160 transmits the encryption keys to nodes 150 of network 110.

Database 380 is any component that can store data associated with system 100. Database 380 may store certain types of information for network 110. Database 380 may be a single database or may include multiple databases. Database 380 stores data stream information 390, data flow paths 392, and wavelength identifications 394. Database 380 includes any one or a combination of volatile or non-volatile local or remote devices suitable for storing information. Database 380 may include RAM, ROM, magnetic storage devices, optical storage devices, or any other suitable information storage device or a combination of these devices. Although database 380 is shown separate from nodes 150 of FIG. 1, database 380 may be located in any location suitable for communication with nodes 150. Database 380 may be externally located from system 100. Database 380 may be located in one or more nodes 150. Although described as a database, database 380 may be implemented as any suitable type of volatile or non-volatile memory. Database 380 may include one or more interfaces and/or processors.

FIG. 4 shows an example method 400 for transmitting a data stream in a network. Method 400 begins at step 405. At step 410, a network controller (e.g., network controller 160 of FIG. 1) receives information associated with a data stream (e.g., data stream 130 of FIG. 1) from a first node (e.g., node 150a of FIG. 2) of a network (e.g., network 110 of FIG. 1). The network may be a software-defined network, the data stream may be an email message, and the first node may be an optical switch. The information may include a bandwidth requirement for the data stream, a destination of the data stream, a level of security for the data stream, a level of sensitivity of the data stream for latency, a level of sensitivity of the data stream for jitter, and/or a level of sensitivity of network 110 for available network data paths.

At step 420, the network controller determines a segmentation for the data stream. The segmentation for the data stream is determined based on information associated with the data stream. The segmentation includes a plurality of data segments. For example, network controller 160 may determine to segment data stream 130 of FIG. 2 into data segments 135a and 135b. Each data segment of the plurality of data segments may be an optical frame. The network controller may determine the number of data segments based on a level of security for the data stream.

At step 430, the network controller determines a data flow path for each of the plurality of data segments of the data stream. The data flow path for each data segment is based on information associated with the data stream. The data flow path specifies the route that each data segment travels through the network. For example, the data flow path for data segment 135a of FIG. 2 begins at start node 150 and traverses through nodes 150b and 150c before arriving at destination node 150d. The network controller may determine the data flow path based on the bandwidth requirement for each data segment of the data stream and the available bandwidth between the nodes of the network.

At step 440, the network controller determines a first wavelength to assign to a first data segment of the plurality of data segments of the data stream. For example, the network controller may use Equation 1 to determine to assign a first wavelength (e.g., wavelength 140a of FIG. 2), represented by channel number 7, or wavelength 1572.06 nanometers (nm) of ITU-T G.694.1, to the first data segment.

At step 450, the network controller transmits the segmentation, the data flow path, and the identification of the first wavelength to the first node (e.g., start node 150a of FIG. 2). The first node segments the data stream in accordance with the received segmentation into a plurality of data segments and transmits a first data segment to a second node (e.g., node 150b of FIG. 2) of the network in accordance with the received data flow path for the first data segment and the received assigned wavelength.

At step 460, the network controller receives information associated with the first data segment from the second node of the network. At step 470, the network controller determines whether the first data segment has reached its destination node. If the first data segment has not reached its destination node, method 400 moves to step 480, where the network controller determines a next wavelength (e.g., wavelength 141c of FIG. 2) to assign to the first data segment of the data stream.

Step 480 then moves back to step 450, where the network controller transmits the identification of the next wavelength to the second node. The second node transmits the first data segment to a third node (e.g., node 150c of FIG. 2) of the network in accordance with the received assigned wavelength. Method 400 again advances to step 460, where the network controller receives information associated with the first data segment from the third node of the network. At step 470, the network controller determines whether the first data segment has reached its destination node.

Steps 450 through 470 repeat until the first data segment has reached its destination node (e.g., destination mode 150d of FIG. 2). When the network controller determines that the first data segment has reached its destination node, method 400 advances to step 490, where the network controller determines a reassembly of the plurality of data segments of the data stream, which includes the first data segment.

Network controller communicates the reassembly to the destination node, and the destination node reassembles the plurality of data segments to create the original data stream received at step 410 and transmits the original data stream to a user edge. Method 400 then moves to step 495, where method 400 ends.

Modifications, additions, or omissions may be made to method 400 depicted in FIG. 3. Method 400 may include more, fewer, or other steps. For example, method 400 may include transmitting, by the network controller, one or more encryption keys to one or more nodes of the network. As another example, method 400 may determine a wavelength to assign to each data segment of the plurality of data segments for each hop between the nodes of the network. Steps may be performed in parallel or in any suitable order. While discussed as specific components completing the steps of method 400, any suitable component of system 100 may perform any step of method 400.

FIG. 5 shows an example computer system that may be used by the systems and methods described herein. For example, any of user edge 120, user edge 122, nodes 150, and network controller 160 of FIG. 1 may include one or more interface(s) 510, processing circuitry 520, memory (ies) 530, and/or other suitable element(s). Interface 510 (e.g., interface 320 of FIG. 3) receives input, sends output, processes the input and/or output, and/or performs other suitable operation. Interface 510 may comprise hardware and/or software.

Processing circuitry 520 (e.g., processor 360 of FIG. 2) performs or manages the operations of the component. Processing circuitry 520 may include hardware and/or software. Examples of a processing circuitry include one or more computers, one or more microprocessors, one or more applications, etc. In certain embodiments, processing circuitry 520 executes logic (e.g., instructions) to perform actions (e.g., operations), such as generating output from input. The logic executed by processing circuitry 520 may be encoded in one or more tangible, non-transitory computer readable media (such as memory 530). For example, the logic may comprise a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

Memory 530 (or memory unit) stores information. Memory 530 (e.g., memory 340 of FIG. 3) may comprise one or more non-transitory, tangible, computer-readable, and/or computer-executable storage media. Examples of memory 530 include computer memory (for example, RAM or ROM), mass storage media (for example, a hard disk), removable storage media (for example, a Compact Disk (CD) or a Digital Video Disk (DVD)), database and/or network storage (for example, a server), and/or other computer-readable medium.

Herein, a computer-readable non-transitory storage medium or media may include one or more semiconductor-based or other integrated circuits (ICs) (such as field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is active, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
    receiving, by a network controller including a processor, a level of security for a data stream;
    determining, by the network controller, a segmentation of the data stream into a plurality of data segments;
    determining, by the network controller, a data flow path through a network for each of the plurality of data segments, wherein the data flow path through the network includes a plurality of hops between a plurality of network nodes;
    determining, by the network controller and responsive to the level of security for the data stream, a different wavelength to assign to each of the plurality of hops for a first data segment of the plurality of data segments; and
    assigning, by the network controller, the different wavelength to each of the plurality of hops for the first data segment between the plurality of network nodes.

2. The method of claim 1, wherein the level of security for the data stream comprises a heightened level of security.

3. The method of claim 1, wherein the determining the different wavelength to assign to each of the plurality of hops for the first data segment between the plurality of network nodes comprises determining the different wavelength using a pseudo-random number generator.

4. The method of claim 1, wherein:
the network is a software-defined network;
the plurality of network nodes comprises optical switches; and
each data segment of the plurality of data segments is an optical frame.

5. The method of claim 1, wherein the determining the segmentation for the data stream is based on information associated with the data stream and the information associated with the data stream comprises one or more of the following:
a bandwidth requirement for the data stream;
a destination of the data stream;
the level of security for the data stream;
a level of sensitivity of the data stream for latency;
a level of sensitivity of the data stream for jitter; and
a level of sensitivity of the network for available network data paths.

6. The method of claim 1, further comprising:
receiving, by the network controller, an encryption key from a key server; and
assigning the encryption key to the first data segment.

7. The method of claim 1, further comprising determining, by the network controller, a reassembly of the plurality of data segments after the plurality of data segments traverse the data flow path.

8. A system comprising:
a processing system including a processor; and
a memory that stores executable instructions that, when executed by the processing system, facilitates performance of operations, the operations comprising:
receiving a level of security for a data stream;
determining a segmentation of the data stream into a plurality of data segments;
determining a data flow path through a network for each of the plurality of data segments, wherein the data flow path through the network includes a plurality of hops between a plurality of network nodes;
determining, responsive to the level of security for the data stream, a different wavelength to assign to each of the plurality of hops for a first data segment of the plurality of data segments; and
assigning the different wavelength to each of the plurality of hops for the first data segment between the plurality of network nodes.

9. The system of claim 8, wherein the determining the different wavelength to assign to each of the plurality of hops for the first data segment between the plurality of network nodes comprises determining the different wavelength using a pseudo-random number generator.

10. The system of claim 8, wherein the plurality of network nodes are part of a public network.

11. The system of claim 8, wherein:
the network is a software-defined network;
the plurality of network nodes comprises optical switches; and
each data segment of the plurality of data segments is an optical frame.

12. The system of claim 8, wherein the determining the segmentation for the data stream is based on information associated with the data stream and the information associated with the data stream comprises one or more of the following:
a bandwidth requirement for the data stream;
a destination of the data stream;
the level of security for the data stream;
a level of sensitivity of the data stream for latency;
a level of sensitivity of the data stream for jitter; and
a level of sensitivity of the network for available network data paths.

13. The system of claim 8, wherein the operations further comprise:
receiving an encryption key from a key server; and
assigning the encryption key to the first data segment.

14. The system of claim 8, wherein the operations further comprise determining a reassembly of the plurality of data segments after the plurality of data segments traverse the data flow path.

15. A non-transitory machine-readable medium, comprising executable instructions that, when executed by a processing system including a processor, facilitate performance of operations, the operations comprising:
receiving a level of security for a data stream;
determining a segmentation of the data stream into a plurality of data segments;
determining a data flow path through a network for each of the plurality of data segments, wherein the data flow path through the network includes a plurality of hops between a plurality of network nodes;
determining, responsive to the level of security for the data stream, a different wavelength to assign to each of the plurality of hops for a first data segment of the plurality of data segments; and
assigning the different wavelength to each of the plurality of hops for the first data segment between the plurality of network nodes.

16. The non-transitory machine-readable medium of claim 15, wherein the determining the different wavelength to assign to each of the plurality of hops for the first data segment between the plurality of network nodes comprises determining the different wavelength using a pseudo-random number generator.

17. The non-transitory machine-readable medium of claim 15, wherein the plurality of network nodes are part of a public network.

18. The non-transitory machine-readable medium of claim 15, wherein:
the network is a software-defined network;
the plurality of network nodes comprises optical switches; and
each data segment of the plurality of data segments is an optical frame.

19. The non-transitory machine-readable medium of claim 15, wherein determining the segmentation for the data stream is based on information associated with the data stream and the information associated with the data stream comprises one or more of the following:
a bandwidth requirement for the data stream;
a destination of the data stream;
the level of security for the data stream;
a level of sensitivity of the data stream for latency;
a level of sensitivity of the data stream for jitter; and
a level of sensitivity of the network for available network data paths.

20. The non-transitory machine-readable medium of claim 15, wherein the operations further comprise:
receiving an encryption key from a key server; and
assigning the encryption key to the first data segment.

* * * * *